Dec. 18, 1962  G. LEUNIG  3,068,845
INTERNAL COMBUSTION ENGINE OPERATING WITH SELF IGNITION
Filed Sept. 21, 1959  5 Sheets-Sheet 1

Inventor
Günther Leunig,
By Pierce, Scheffler & Parker
his Attorneys

Dec. 18, 1962 G. LEUNIG 3,068,845
INTERNAL COMBUSTION ENGINE OPERATING WITH SELF IGNITION
Filed Sept. 21, 1959 5 Sheets-Sheet 3

INVENTOR.
GUNTHER LEUNIG
BY
Pierce, Scheffler & Parker
his ATTORNEYS.

United States Patent Office

3,068,845
Patented Dec. 18, 1962

3,068,845
INTERNAL COMBUSTION ENGINE OPERATING WITH SELF IGNITION
Günther Leunig, Bad Homburg, Germany, assignor to Gesellschaft für Linde's Eismaschinen Aktiengesellschaft, Munich, Germany, a company of Germany
Filed Sept. 21, 1959, Ser. No. 841,395
Claims priority, application Germany, Nov. 28, 1958
6 Claims. (Cl. 123—30)

An internal combustion engine, operating with self ignition, is known in which a part of the fuel quantity assigned for one cycle of the cylinder in question, and stored in the vicinity of the combustion space, is carried along during the compression stroke of the engine piston by the air flowing from the main combustion chamber into the cylinder into a secondary combustion chamber through a duct, ignites in the secondary combustion chamber and begins to burn while the other part of the fuel is carried along by the return stream of the burning fuel-air mixture effected by the pressure increase in the secondary combustion chamber through a second duct into the main combustion chamber, and burns there. This engine, whose secondary combustion chamber is fashioned as ante-chamber with irregular flow, could be made to run under certain conditions, but proved to be unreliable in starting and under changing operating conditions. The fuel must be introduced into the storage chamber under excess pressure through a positively controlled valve. An auxiliary ignition equipment is required for starting.

In recent years concepts regarding the course of the ignition and combustion in a diesel engine have changed. The new concepts have in the meantime found expression and confirmation in several construction types. According to these it is most favorable with a view to quiet operation, low peak pressures, insensitiveness with regard to the type of fuel and low fuel consumption, if only a small fraction of the fuel quantity injected into the combustion chamber per cycle ignites itself due to the compression heat; the majority of the injected fuel is to be protected against self-ignition until the fuel has vaporized. The fuel vapor is then separately ignited at the rate of its formation—therefore, always in small partial quantities—by the "igniting flame" which has developed from the small self-ignited fuel quantity. The procedures and devices for execution of these procedures that have become known to date, which make use of the new research result, however, do not manage without injection pump and injection nozzle.

In the internal combustion engine fashioned according to the invention, the quantity of fuel required for one working stroke is stored before the beginning of the compression stroke, in a manner known as such, in the vicinity of the combustion space, and the stored quantity of fuel is transported from the storage chamber through ducts during the compression stroke by the air streaming out of the main combustion chamber into a combustion chamber connected with it through a constricted transfer channel. In contrast to the known engine, in which the ducts join the transfer channel shortly before and shortly behind the constriction, one of these ducts—according to the object of the invention, the scavenging duct—opens into the main combustion chamber above the upper piston reversing position, and another one, the feeding duct, opens approximately at the narrowest spot in the transfer channel. Furthermore the fuel-air mixture is introduced tangentially into the combustion chamber which has a constant curvature at the internal periphery, whereby the transfer channel and the combustion chamber are so fashioned and dimensioned that the mixture in the combustion chamber is accelerated to a relatively high rotating velocity, so that the heavier fuel droplets are thrown out against the combustion chamber wall, which is so cooled (by known means) that on the one hand there can set in no decomposition of the fuel and on the other hand a vaporization of the fuel is assured.

The arrangement of the connecting ducts between storage space and combustion space according to the invention assures the highest possible suction effect on the fuel to be transported into the combustion chamber during the compression stroke. For a pressure acts on the opening of the scavenging duct into the main combustion chamber which with the slight air motion at this point (transition of the radial flow in the cylinder above the engine piston into an approximately axial flow through the transfer channel to the combustion chamber) is practically equal to the total pressure in a given case, whereas a pressure acts on the (feed) duct opening at approximately the narrowest spot of the transfer channel which is smaller than the total pressure by the dynamic pressure corresponding to the highest velocity in the transfer channel. The difference between these two pressures is available for the acceleration and transportation of the stored fuel. This fuel is transported into the combustion chamber not merely partially as in the known engine, but substantially in its entire amount during the compression stroke. The arrangement of the ducts according to the invention, moreover, has the important effect, during the suction stroke, that the fuel can be led into the storage chamber without the aid of a feed pump or by static pressure, merely through the suction effect of the engine piston.

Into the supply pipe line for the fuel leading to the storage chamber there are inserted check valves to prevent a return flow or a gas penetration during the working stroke, as well as a throttle valve by which the fuel quantity—and, thus, the engine output—are regulated. In order to keep constant the pressure in the fuel line, it is expedient to insert into this line an intermediate container, whose liquid level is kept constant, for example, by a float arrangement. The liquid level is expediently made adjustable.

Through the fashioning of the combustion chamber as a centrifugal chamber the result is achieved that a greater part of the fuel hits the combustion chamber wall in liquid form, which liquid under the influence of a suitable wall temperature gradually vaporizes into the interior of the rotating mixture vortex. Comparatively fine droplets of the fuel pass into the interior of the vortex as a result of their small mass, where they first ignite and act as igniting flame for the larger drops which are thrown against the wall and gradually vaporized.

In operation, the combustion chamber wall is, by measures known as such, for example cooling with air or water, maintained at a temperature which makes the premature decomposition of the fuel impossible.

In order to assure the starting of the cold engine without auxiliary means, particularly an engine with relatively small structural dimensions, and in order to achieve additional improvements in the combustion, it is expedient that the fuel arriving at the peripheral wall of the chamber in the liquid state and rotating with a lesser velocity than the air-fuel vapor vortex in the chamber, due to the influences of inertia and friction, is sprayed into the interior of the chamber where appreciably higher temperatures prevail and a higher excess of air is present than at the chamber wall.

The improvement in ignition and combustion can be explained as follows: In its rotating movement the fuel-liquid ring—insofar as it has not yet vaporized—also reaches the opening of the transfer channel to the cylinder with its frontal wave. In this it is aspirated by the air newly streaming through the channel with high velocity during the time of the compression stroke, and is sprayed by the latter. The droplets formed thereby, which droplets are comparatively large, first arrive at the inner margin of the vortex before they move to the peripheral wall of the chamber under the effect of their mass inertia. Since the fuel components which vaporize least readily are generally the easiest to ignite, they are given the opportunity for self-ignition at this point. As during the short period in which the droplets, after leaving the separation edge, are in suspension, their surface temperature often remains too low for the development of a vapor envelope in which the ignition can set in the path which the fuel droplets must traverse in moving past the transfer channel opening is prolonged according to the invention, and this path is moreover shifted into the region of higher temperatures, for example by fashioning the disc-shaped combustion chamber at its periphery not in circular form but in the form of a spiral or a similar curve which fulfills the purpose, and creating a separating edge for the liquid ring at a suitable place.

It is also expedient when the inner wall of a rotation-symmetrical combustion chamber proceeds in the direction of propagation of the fuel-air mixture, streaming in during the compression stroke in an oblique-tangential manner (approximately helically), at one side, to end in an inward directed tip or sharp edge approximately at the opposite side.

Especially under hot running conditions and under full load, as well as with low number of revolutions and low viscosity fuel, it may happen that the fuel remains not in the storage chamber during the suction stroke, but is transported to an appreciable portion through it through the scavenging duct into the cylinder. Since the partial quantity of the fuel which has streamed over into the cylinder is heated for a longer time and more strongly than the partial quantity which remained in the storage chamber, it can ignite prematurely and disturb the intended course of the combustion. This drawback is avoided by forming the storage chamber as a flow interrupter, whereby the inertia of the fuel entering into the storage chamber during the suction stroke counteracts an immediate further streaming in the direction of the pressure gradient, that is, in the direction of the scavenging duct. A special embodiment provides for the inner wall of the storage chamber to be fashioned as guide surface of the fuel with a steady curvature along a two- or three-dimensional curve, whereby the fuel supply line opens into the storage chamber approximately tangentially to the curvature, the scavenging and feed ducts on the other hand being approximately in the axis of the curvature. The curvature can be executed, for example, according to a circular or helical line or according to a two- or three-dimensional spiral line.

It also is expedient if the fuel supply line opens into the storage chamber in the opposite direction to the pressure gradient which is brought about with the scavenging duct during the suction stroke of the piston.

The influx of the fuel to the storage chamber can be adapted to the operating requirements in a given case similarly as in Otto-engine carburetors by means of nozzles with different cross-sections, which are inserted into the supply line, the scavenging duct and/or the feed duct.

Instead of one scavenging and feed duct each, there can also be provided two or more of each of these, which plural ducts may open into the main combustion chamber, or into the transfer channel, at places spaced relative to each other.

Examples of execution of the object of the invention are represented in the figures of the appended drawing and described in the following, in which figures the same or corresponding parts are designated throughout with the same reference numerals.

The invention is illustrated in the accompanying drawings as follows.

Figure 3:
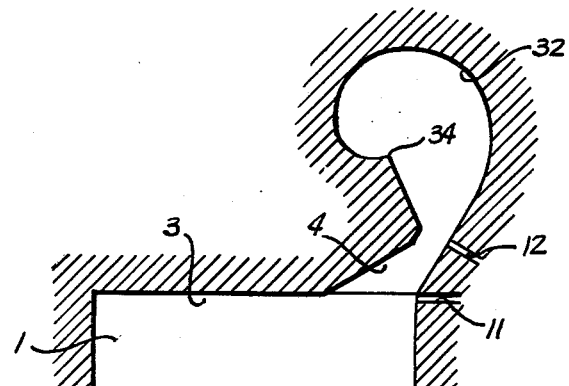
Figure 4:
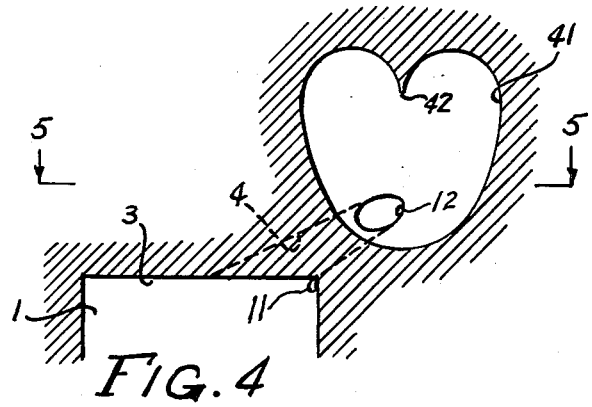
Figure 5:
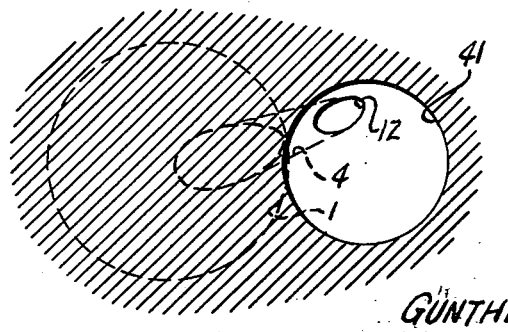
Figure 6:
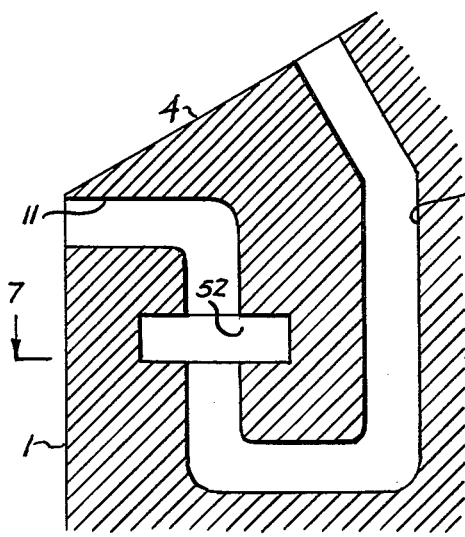
Figure 8:
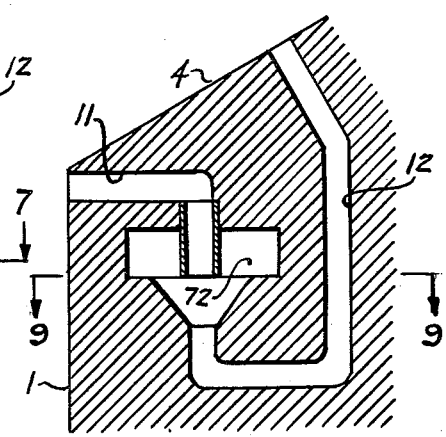
Figure 7:
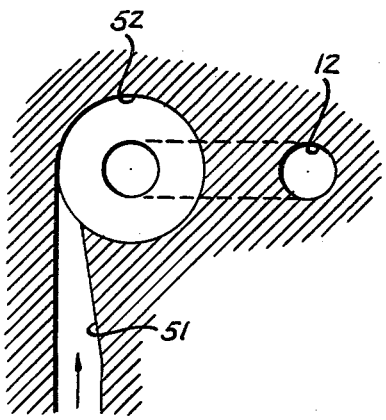
Figure 9:
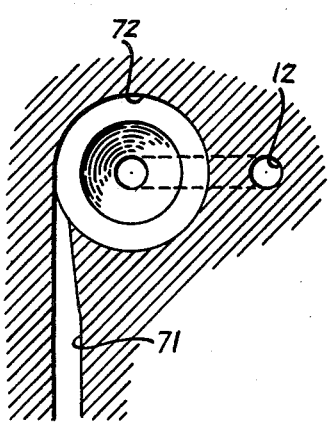

FIG. 3 diagrammatically shows a modified form of secondary chamber;

FIGS. 4 and 5 show a further modified form of secondary combustion chamber;

FIGS. 6 and 7 show two enlarged sectional views of a modified form of fuel storage chamber;

FIGS. 8 and 9 show two sectional views of another modification of the fuel storage chamber;

FIGS. 10 and 11, and 12 and 13 show similar sections of further modifications of fuel storage chamber, and FIGS. 14 and 15, and 16 and 17, show three other modifications of the fuel storage chamber.

Figure 1:
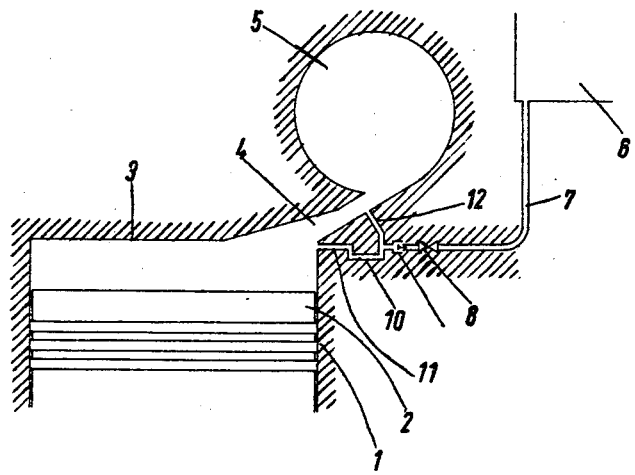
FIG. 1 is a sectional view through the cylinder and combustion space of an internal combustion engine according to one form of the present invention.

FIGURE 1 shows diagrammatically a section through the combustion chamber of an internal combustion engine according to the invention. In one cylinder 1 moves a piston 2, which is drawn in a position below the upper dead center. The main combustion chamber between the piston 2 and the cylinder head 3 is connected by means of a transfer channel 4 to a combustion chamber 5, the transfer channel 4 being constricted in the direction of combustion chamber 5 and opens tangentially into the latter. From a fuel tank 6 a supply line 7 leads through a throttle valve 8 and a check valve 9 to a storage chamber 10, whose one side is connected by means of a scavenging duct 11 to the main combustion chamber above the upper dead center of the piston, and whose other end is connected by means of a feed duct 12 approximately with the narrowest spot of the channel 5.

During the suction stroke of the piston, fuel streams from the fuel tank 6 through the supply line 7, the throttle valve 8 and the check valve 9 into the storage chamber 10, where it is stored for the time being. During the compression stroke the air streaming from the main combustion chamber above the piston through the transfer channel 4 into the disc-shaped or spherically fashioned combustion chamber 5 draws the fuel out of the storage chamber 10 through the feed duct 12 and then, with formation of a rotating vortex in the combustion chamber 5 through the effect of inertia, throws it partially out against the chamber wall. In this the channel 4 and the combustion chamber 5 are so fashioned and dimensioned that the mixture in the combustion chamber 5 is accelerated to a comparatively high speed of rotation, so that the heavier fuel droplets are thrown out against the combustion chamber wall which is so cooled, by means known per se, that on the one hand there can set in no decomposition of the fuel, and on the other hand a vaporization of the fuel is assured.

Figure 2:
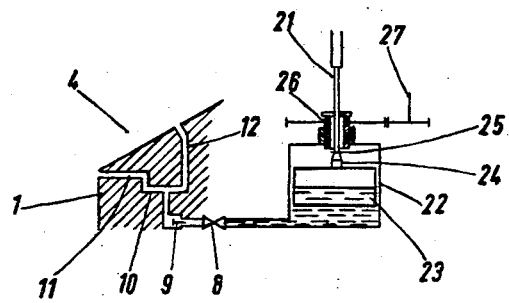
FIG. 2 is an enlarged sectional view of the fuel storage chamber and another form of fuel supply means thereto.

FIGURE 2 shows another device for fuel storage in the storage chamber 10. In this version, the fuel arrives through a movable supply line 21 in a float chamber 22 which is inserted as intermediate fuel container. In this float chamber 22 is a float 23, whose needle 24 closes off the opening 25 of the supply line 21 when the float has been raised by the fuel. From the float chamber 22 the fuel arrives through the throttle valve 8 and the check valve 9 in the storage chamber 10. The dimension and arrangement of the storage chamber 10, the ducts 11 and 12 and the arrangement of the float chamber 22 as intermediate fuel container are means for compensating the influence of the number of engine revolutions on the fuel influx to the storage chamber 10 and on the suction effect of the air streaming through the channel 4 to the fuel stored in the storage chamber 10. For the regulation of the fuel level in the float chamber 22 there is provided an adjusting mechanism which is indicated by the adjusting screw 26 and the adjusting member 27, with the aid of which the opening 25 of the fuel supply line 21 is controllable.

FIGURE 3 shows diagrammatically a section through the combustion chamber with a combustion chamber 32 which reproduces one form of cross-section according to the Archimedes spiral, this chamber ending at 34 as a separating edge. Through this measure it is achieved that the fuel arriving in the fluid state at the combustion chamber wall is sprayed onto the inside of the combustion chamber through which ignition in starting and under low load is considerably facilitated and the air utilization improved. The combustion chamber according to the cross-section form of FIGURE 3, is based on an Archimedian spiral, which has in polar coordinates the equation $r = n \cdot (r_0/2\pi) \cdot \varphi$, wherein $r$ is the distance of the actual curve point on the radius vector from the starting point of the spiral, $\varphi$ the angle in degrees of arc (arc measure or radian), $r$ the distance on the radius vector in the case $\varphi = 2\pi$ or 360°, and $n$ a factor smaller than 1. By variation of the factor "$n$" the position of the separating edge and therewith the path which the fuel droplets must traverse through a hot zone from wall to wall can be changed. This path has to be so chosen that on the one hand the ignition will be accelerated and on the other hand the fuel will not be prematurely decomposed, or too large a fuel quantity comes to the inflammation point at once. Moreover, the dead streaming zone, which results when the separating edge is connected with the entering edge of the transfer channel 4 into the combustion chamber, is diminished.

The expression "dead streaming zone" is intended to refer to a zone which appears when air—during the compression stroke—flows with a high velocity through the transfer channel 4 into the chamber 5. At the narrowest part of the transfer channel the air is compressed into a "jet" which moves in the direction of the axis of said narrowest part until it is diverted from this direction by the curving wall of the combustion chamber. Under these flow velocity conditions the angle of divergence of the current (passing beyond said narrowest part) is substantially less than the angle of extension of the transfer channel. The air current passing along the curving wall of the combustion chamber detaches itself at edge 34 and flows toward said jet. Between these two currents forms the aforesaid "dead streaming zone."

FIGURES 4 and 5 show in cross-section and in a section along line 5—5 a symmetrical-shaped combustion chamber 41. The opening of this chamber, through which the air-fluid mixture flows in, corresponds to the restricted end of the transfer channel 4 according to FIG. 1. The ducts 11, 12 are—in the same manner as in FIG. 1—connected with the cylinder between the piston 2 and the cylinder head 3 and the transfer channel 4. The chamber 41 is so fashioned that the stream of air mixed with fuel streams in approximately obliquely-tangentially, whereby the fuel particles are partly thrown out against the combustion chamber wall, so that a fuel band forms which is carried along by the stream of air, rotating helically, and is set into increasingly faster rotation in the manner of a potential eddy until it separates at a prominence 42 developed as tip or edge and is sprayed to the inside of the chamber. The sprayed fuel droplets thus arrive in the region of the highest temperature and the greatest air excess.

FIGS. 6–13 show further possibilities of construction for the storage chamber 10 in FIG. 1. These chambers are in the same way connected by a scavenging duct 11 with the main combustion chamber above the upper piston-reversing position and by a feed duct 12 opening into the transfer channel 4 at approximately the narrowest part of this channel. The supply lines 51, 71 and 91 correspond to the supply line 7 in FIG. 1.

FIGURES 6 and 7 diagrammatically show in elevation and top view a storage chamber for the stored fuel with a wall curved in the form of a circle in one plane. The fuel enters into the storage chamber tangentially to the inner wall with constant curvature, through the supply line 51. The scavenging duct 11 and the feed duct 12 open into the storage chamber 52 perpendicular to the plane of the curvature at opposite end planes. Such a storage chamber 52 has the effect of a flow interrupter. The fuel entering tangentially into the storage chamber 52 is forced into a circular rotating movement by the constantly curved inner wall. Thereby the individual fuel particles experience the effect of a centrifugal force which drives them in the direction towards the peripheral wall. This centrifugal force grows inversely with the third power of the radius as the axis is approached, and thereby prevents substantial quantities of fuel from getting into the scavenging duct 11 during the suction stroke of the piston. It also prevents the further fuel supply through the supply line 51 in the degree that a rotating fluid ring develops. During the compression stroke of the piston, compressed air streams via the path 11—52—12 through the storage chamber 52. Since the fuel rotating movement no longer receives impulses from the supply line 51, the rotation becomes slower and the fuel gathers in the chamber part turned towards the feed duct 12, as well as in the feed duct 12 itself. It is here taken along by the stream of air, and is transported to the channel 4 and into the combustion chamber 5. In order for the stream of air to occupy the storage chamber 52 as free of eddies as possible, and to take along the fuel stored in it completely, the opening of the scavenging duct 11 into the storage chamber 52 can also be fashioned conically in the manner of a diffuser, as indicated with lines 54 seen in the modified form shown in FIG. 14.

FIGURES 8 and 9 diagrammatically show in elevation and topview that the opening of the scavenging duct 11 may extend in the form of a pipe socket into the interior of the storage chamber 72, by which means a passage of fuel into the scavenging duct 11 is further obstructed during the suction stroke of the piston. The projecting pipe socket can also be developed with curvature or with baffles as indicated by the tangential form 73 shown in FIGS. 15 and 16, so that the air streaming into the storage chamber 72 through the scavenging duct 11 is given a rotating motion during the compression stroke of the piston, so that the fuel present in the storage chamber 72 is carried along by the rotating stream of air. The supply line 71 here, also, opens tangentially into storage chamber 72, whereby for the purpose of a better passage of the fuel from the supply line 71 to the constantly curved inner wall of the storage chamber 72 the latter can also be developed in semicircular form or with any desired curvature for the radial section.

Figure 10:
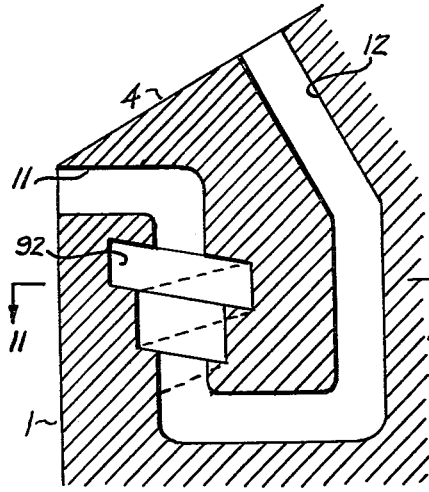
Figure 11:
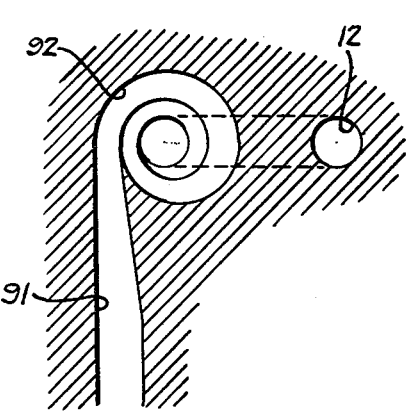
Figure 17:
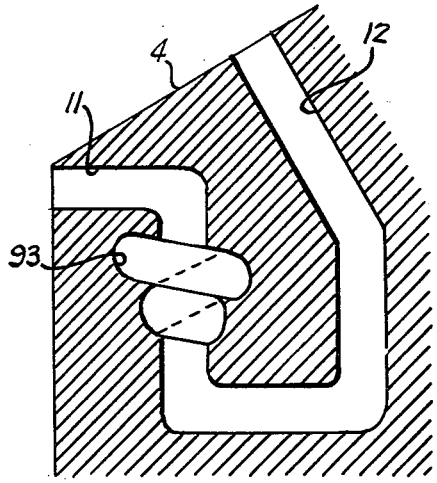
Figure 16:
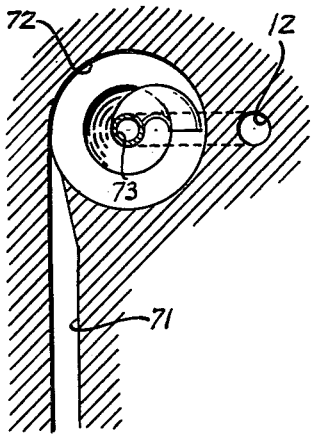

FIGURES 10 and 11 diagrammatically show in elevation and topview a supply line 91 for the fuel, a scavenging duct 11, a feed duct 12, and a storage chamber 92 whose inner wall is curved along a helical line, namely in such a way that the radius of curvature decreases steadily from a maximum value at the tangential opening of the supply line 91 to a minimum value which corresponds approximately to the radius of the feed duct 12. By means of this configuration of the wall the suctioned fuel is forcibly introduced into the feed duct 12 and transported thence into the channel 4 and combustion chamber 5 during the compression stroke of the piston. The lines 93 seen in the modified form illustrated in FIG. 17, illustrate that the wall cross-section can also be developed with curvature in the radial plane.

Figure 12:
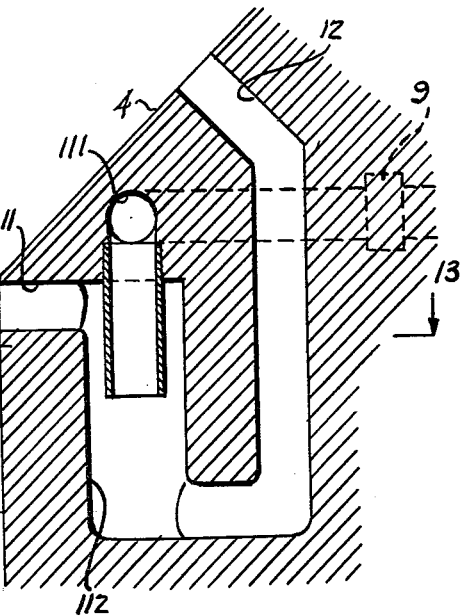
Figure 13:
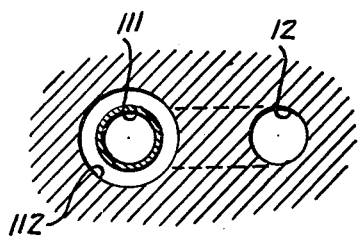
Figure 14:
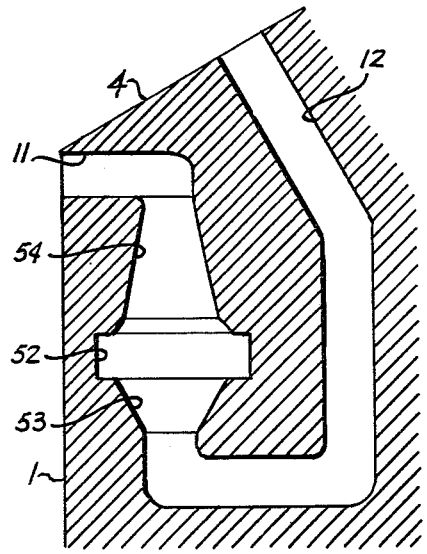
Figure 15:
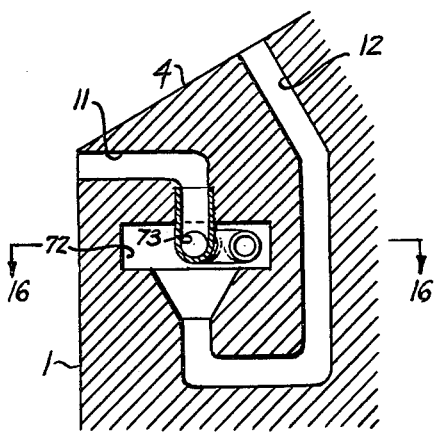

FIGURES 12 and 13 show in elevation and top view a fuel supply line 111, which extends in the manner of a pipe socket into a cylindrical storage chamber 112. From the storage chamber 112 a scavenging duct 11 leads to the main combustion chamber and a feed duct 12 to the channel 4 of the internal combustion engine, at opposite ends of the storage chamber, in such a way that the feed duct 12 is arranged in the direction of the fuel streaming in through the supply line 111. In this embodiment the undesirable entrance of fuel into the main combustion chamber during the suction stroke of the piston is prevented in that the fuel would first have to undergo a deflection in the storage chamber 112 before it could arrive at the scavenging duct 11, for which the time generally available is not sufficient. This type of storage of the fuel in the storage chamber 112 occurs without additional flow resistance. It is also possible to exchange the scavenging duct 11 and the fuel supply line 111 with each other, whereby the supply line 111 can also be carried out with a gentle curvature in order to reduce the flow-in resistance.

The fashioning of the storage chamber 52, 72, 92 or 112 represented in the examples of execution, with the effect of a flow interrupter, also corresponds to the different conditions with the internal combustion engine cold and warm from operation, in that as long as the engine is cold, the fuel also remains cold and therefore viscous, so that with a given pressure gradient it enters the storage chamber with comparatively low velocity, through which it experiences a correspondingly small inertia effect. The throttle effect is small in this. But since the internal friction of the fuel is comparatively great, fuel is prevented from entering through the scavenging duct 11. To the extent that the heating of the fuel increases and its viscosity correspondingly decreases, its entrance velocity rises and consequently so does the effect of the flow interrupter. The influence of the temperature on the fuel supply and its storage is, therefore, balanced for the most part. The axis of the storage chamber 52, 72, 92, 112 need not necessarily be perpendicular, as drawn, but may assume any arbitrary position, depending on the structural requirements.

I claim:

1. An internal combustion engine, operating exclusively with self ignition, which comprises
   a cylinder and a reciprocating piston in said cylinder there being a main combustion chamber in that part of said cylinder above the upper piston-reversing position therein,
   a second combustion chamber,
   a transfer channel connecting said main and said second combustion chambers, said main and second combustion chambers and transfer channel constituting a combustion space, said transfer channel being progressively constricted in the direction from the main combustion chamber toward the second combustion chamber to a point of maximum constriction,
   a fuel tank,
   a fuel storage chamber arranged in the vicinity of the main combustion chamber,
   a pipe line leading from the fuel tank to the fuel storage chamber,
   a feed duct and a scavenging duct connecting the fuel storage chamber with said combustion space, said scavenging duct having an outlet into said main combustion chamber and said feed duct having an outlet into said transfer channel at said point of maximum construction,
   that portion of the inner wall of the second combustion chamber which is immediately adjacent the outlet of said transfer channel thereinto being substantially straight and in alignment with the immediately adjacent portion of the surface of said transfer channel, the remainder of the inner wall of said second combustion chamber being continuously concavely curved and tangent to said substantially straight portion of said inner wall, said outlet of said feed duct being in that surface of said transfer channel which is in alignment with said substantially straight portion of said inner wall, whereby liquid droplets of fuel aspirated into said transfer channel from said feed duct are deposited by centrifugal action upon said curved inner wall and thereafter progressively vaporized.

2. The engine defined in claim 1, wherein the curved inner wall of said second combustion chamber has a receding part forming a separating or spraying edge for liquid fuel flowing along the inner wall of said chamber.

3. The engine defined in claim 2, wherein the inner wall of said second combustion chamber has approximately the form of a spiral, the part of which with the smaller radius of curvature ending at said separating edge.

4. The engine defined in claim 1, wherein the inner wall of the second combustion chamber is cylindrical, and has at one end of its axial length a projecting part forming a separating or spraying tip or edge for liquid fuel flowing along the inner wall of said chamber, the transfer channel entering into said chamber in the vicinity of the other end of the axial length of said chamber, liquid fuel propagating approximately helically along the inner wall of said chamber.

5. The engine defined in claim 1, wherein the inner wall of the storage chamber has a continuous curvature as guide surface for entering fuel, said pipe line entering approximately tangentially into said storage chamber, whereas the scavenging duct and the feed duct enter approximately in the axis of the curvature.

6. The engine defined in claim 1, wherein said pipe line enters said storage chamber in a direction opposite to the direction which fuel must follow during a suction stroke of the piston to enter into the scavenging duct.

References Cited in the file of this patent

UNITED STATES PATENTS

| 2,106,914 | L'Orange | Feb. 1, 1938 |
| 2,783,747 | Layne | Mar. 5, 1957 |

FOREIGN PATENTS

| 932,999 | Germany | Sept. 15, 1955 |
| 949,014 | Germany | Sept. 13, 1956 |

UNITED STATES PATENT OFFICE
CERTIFICATE OF CORRECTION

Patent No. 3,068,845                                          December 18, 1962

Günther Leunig

It is hereby certified that error appears in the above numbered patent requiring correction and that the said Letters Patent should read as corrected below.

Column 8, line 3, for "construction" read -- constriction --.

Signed and sealed this 21st day of May 1963.

(SEAL)
Attest:

ERNEST W. SWIDER
Attesting Officer

DAVID L. LADD
Commissioner of Patents